W. W. DEAN.
DEVICE FOR OBTAINING PREDETERMINED SPEED.
APPLICATION FILED JULY 6, 1917.
1,285,639.
Patented Nov. 26, 1918.
2 SHEETS—SHEET 1.
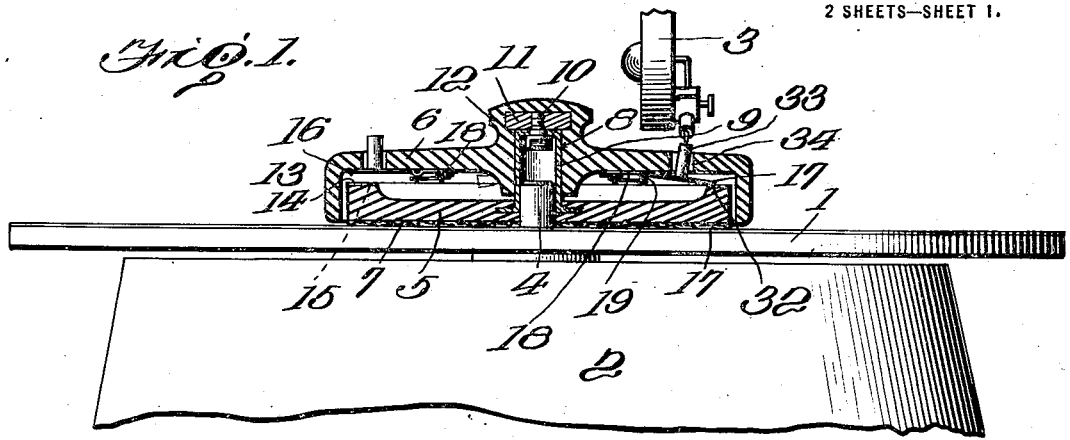
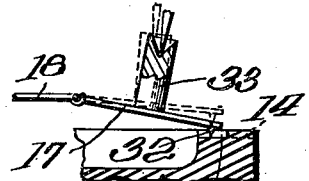
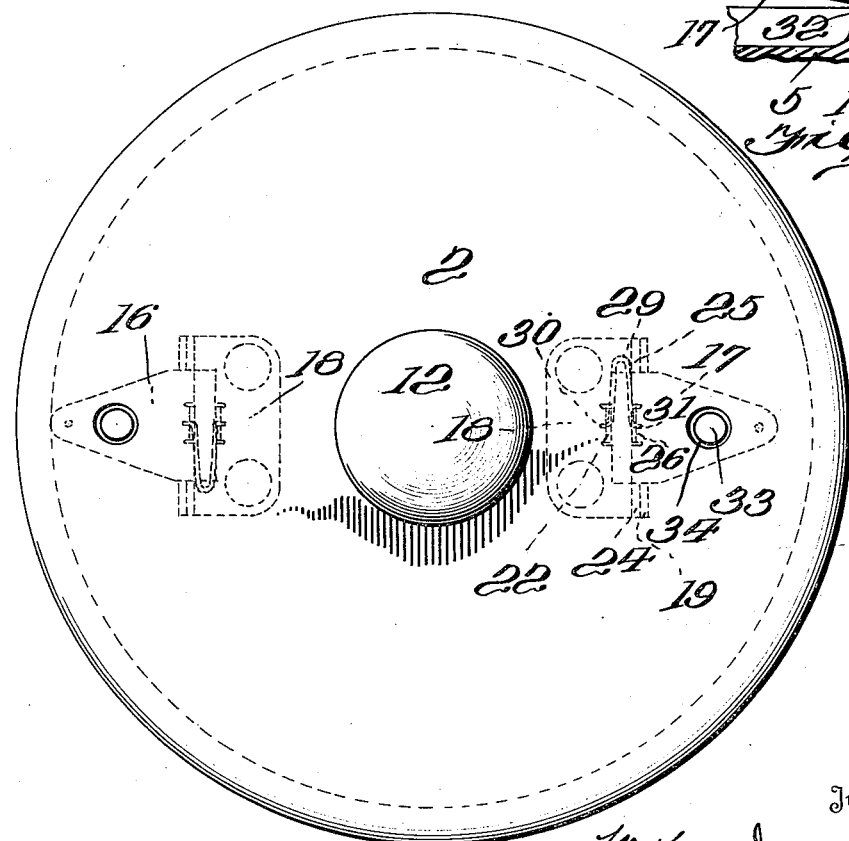
Inventor
W. W. Dean
By H. R. Van Deventer
Attorney W. W. DEAN.
DEVICE FOR OBTAINING PREDETERMINED SPEED.
APPLICATION FILED JULY 6, 1917.
1,285,639.
Patented Nov. 26, 1918.
2 SHEETS—SHEET 2.
Fig. 3.
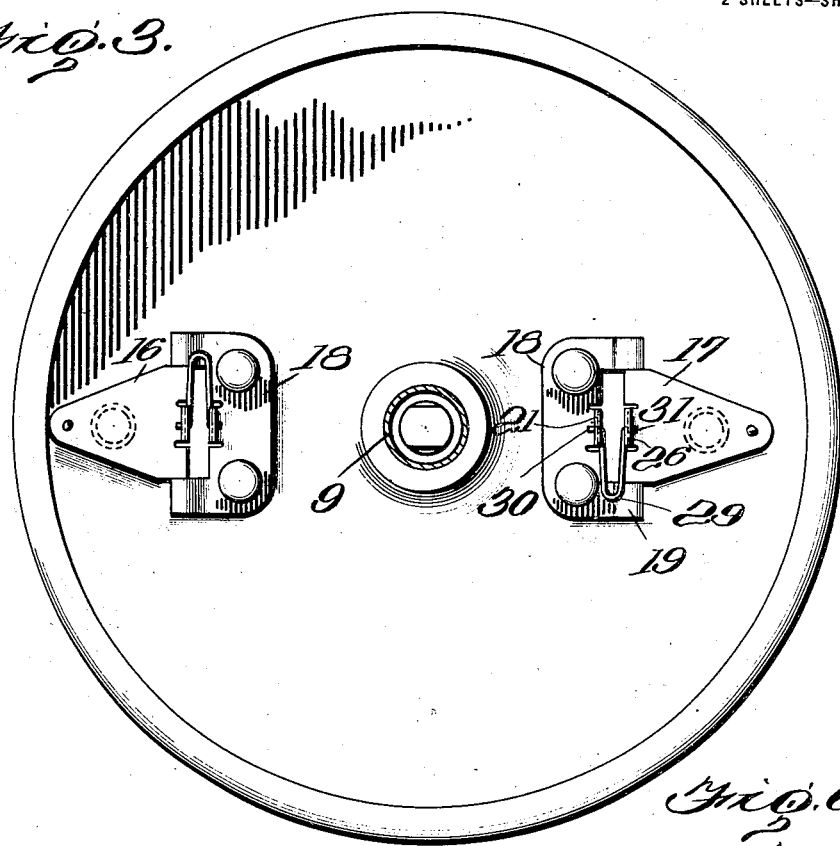
Fig. 4.
Fig. 6.
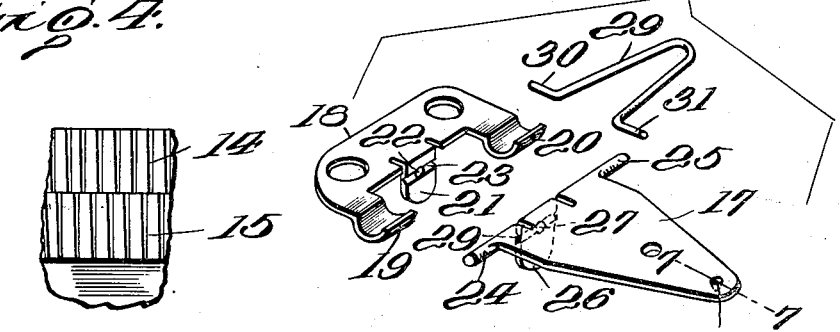
Fig. 5.
Fig. 7.
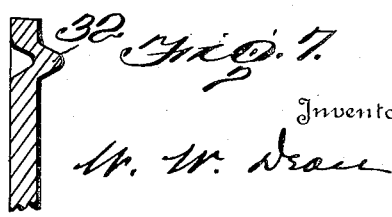
Inventor
W. W. Dean
By H. K. Van Deventer
Attorney

UNITED STATES PATENT OFFICE.

WILLIAM WARREN DEAN, OF STAMFORD, CONNECTICUT, ASSIGNOR TO SPLITDORF ELECTRICAL COMPANY, OF NEWARK, NEW JERSEY, A CORPORATION OF NEW JERSEY.

DEVICE FOR OBTAINING PREDETERMINED SPEED.

1,285,639.

Specification of Letters Patent.   Patented Nov. 26, 1918.

Application filed July 6, 1917.   Serial No. 179,062.

*To all whom it may concern:*

Be it known that I, WILLIAM W. DEAN, a citizen of the United States, residing at Stamford, in the county of Fairfield and State of Connecticut, have invented certain new and useful Improvements in Devices for Obtaining Predetermined Speed, of which the following is a specification, reference being had to the accompanying drawing.

The invention relates to new and useful improvements in devices for obtaining a predetermined speed and more particularly to a device for obtaining the proper speed of a phonographic record.

It is well known that phonograph records are designed to be operated at a predetermined speed. In some instances the table is designed to make seventy eight revolutions per minute, while in others it should make eighty revolutions per minute. A great deal of difficulty has been experienced in obtaining accurately the speed of the record table. Many of the machines are provided with speed indicators but these indicators depend upon mechanism which is liable to wear with the result that while the indicator may read 78, or whatever the standard of speed may be, the machine is not actually making that number of revolutions.

Key records have also been used to determine the speed of the table of the phonograph, such records having impressed thereon a certain selected sustained note and the speed of the machine is then adjusted until the sound reproduced corresponds to a pitch pipe or tuning fork of the selected note on the record. Difficulties have been experienced in obtaining an absolutely correct, sustained and uniform speed for the standard or master phonograph on which the master key record is made, and also in producing a standard note of exactly the correct pitch.

An object of the invention is to provide means for obtaining the speed of the phonograph table wherein a sound is produced by a member which is mathematically divided so as to produce an exact tone and in the comparing of this sound with a standard pitch pipe or tuning fork of the same pitch as the mathematically divided member should produce when driven at the speed desired for the phonograph table.

A further object of the invention is to provide a device for obtaining a predetermined speed, of the above character, which may also be used for obtaining a desired speed in any rotating member.

These and other objects will in part be obvious and will in part be hereinafter more fully disclosed.

In the drawings, which show by way of illustration one embodiment of the invention:—

Figure 1 is a sectional view through my improved speed obtaining device, showing the same applied to the phonograph table;

Fig. 2 is an enlarged plan view of the speed obtaining device;

Fig. 3 is a bottom plan view of the upper member of the speed obtaining device;

Fig. 4 is a sectional view of a portion of the lower member;

Fig. 5 is an edge view of a portion of the lower member of the speed obtaining device;

Fig. 6 is a separated perspective view of one of the sustaining brackets, the vibrating member and the spring coöperating therewith; and Fig. 7 is an enlarged sectional view on the line 7—7 of Fig. 6.

Fig. 8 is an enlarged view showing the vibrating device and in dotted lines the movement of the same.

In my prior application, Serial No. 172,066, filed May 31, 1917, I have described and claimed broadly, a method of determining the speed in a driven member, which method consists broadly in producing a sound by a mathematically revoluble member moved by and in synchronism with the driven member and comparing said sound with a sound of known pitch and then regulating the speed of the driven member until the sound produced thereby bears a certain relation to the sound of known pitch.

The present invention is directed to a device for carrying out the method in my prior application, said device consisting broadly in a member which is adapted to be driven by and in synchronism with the member, the speed of which it is desired to regulate. This member is provided with serrations or teeth which are mathematically formed so that there is an exact number of teeth on the member which may be utilized for producing vibrations so that an exact or predetermined number of vibrations will be produced for each complete rotation of said member. Coöperating with this driven member is a vibrating part which may be used directly or indirectly for producing a sound. The sound thus produced depends upon the speed of the driven member and also upon the speed of the part the speed of which it is desired to regulate. The sound produced through this vibrating member is then compared with a standard pitch pipe or tuning fork which produces a tone which should be produced by the mathematically divided member when driven at the predetermined speed desired. Then the member or device of which it is desired to obtain the predetermined speed is regulated until the sound produced by said mathematically divided member bears a certain relation to the sound of known pitch.

While my device is adapted to obtain the speed of any driven member it is particularly adapted for obtaining a predetermined speed in a phonograph table. I will, therefore, describe the invention as applied to this apparatus it being understood, however, that such description does not limit the invention which is defined by the claims appended to this application.

In Fig. 1 of the drawing I have shown diagrammatically a rotating table 1 of a phonograph which is adapted to carry a disk record. This table is mounted upon any suitable support 2 and is driven by the usual driving mechanism. Means is also provided for regulating the speed of this table. I have also shown in the drawings at 3, the ordinary sound producing instrument used in connection with the disk record. These parts are of the usual construction and have not been shown in detail.

Extending centrally up through the record is the centering pin 4 for the record. My improved speed obtaining device consists of a driven member 5 and a stationary member 6. These parts are preferably made of bakelite. The driven member has an opening centrally therethrough adapted to receive the centering pin 4 of the phonograph table. Said driven member is also provided with a felt pad 7. Said member when placed on the phonograph table will rotate with the phonograph table there being sufficient friction between the felt pad and the table or record disk to cause the member 5 to be rotated by and in synchronism with the table 1.

The stationary member 6 is provided with a central recess 8. Molded in the driven member is a sleeve 9 which is adapted to extend up into the recess 8 and the parts are held together by a screw 10 which is threaded into a metal part 11 molded into the stationary member 6. The head of the screw 10 is larger than the opening through the end of the sleeve and thus the parts are held together but the lower part is permitted to rotate freely relative to the upper part.

Said stationary part 6 is provided with a knurled head 12 which the operator may grasp to hold this member 6 from turning. Said member 6 is provided with a depending flange 13 which extends below the upper surface of the driven member 5 but is free from the same so that the driven member may turn freely.

The driven member 5 is provided with two serrated surfaces 14 and 15 respectively. These surfaces are shown in the enlarged views in Figs. 4 and 5. The surfaces 14 and 15 are mathematically divided so as to form serrations or teeth of an exact predetermined number. The method of determining the number of serrations or teeth will be hereinafter more fully stated.

Coöperating with the surface 14 is a vibrating member 16 and coöperating with the surface 15 is a vibrating member 17. These two members are exactly the same in construction and the description of one will answer for the other. Mounted on the under surface of the stationary member 6 is a bracket 18. Said bracket may be secured to the member 6 in any desired way. Said bracket has spaced inwardly projecting arms 19 and 20 and a central outwardly extending lug 21. Said lug 21 has an aperture 22 and a groove 23. The vibrating member is formed with laterally projecting pintles 24 and 25. The arms 19 and 20 are curved so as to form bearings for the pintles 24 and 25 respectively. This vibrating member 17 is hinged to the member 6 through the bracket 18. Said vibrating member has a downwardly extending lug 26 which is formed with an aperture 27 and a groove 28. A spring 29 is provided with outwardly turned ends 30 and 31 which are adapted to enter the apertures 22 and 27 respectively, and the spring is seated in the grooves 27 and 29. This spring normally tends to move the hinged member to normal inoperative position, that is, out of engagement with the serrations in the driven member.

At the outer end of the vibrating member the metal is depressed so as to form a projection 32. This projection is adapted to ride on the serrations and causes the member carrying the same to vibrate. The vibrating member is also provided with a post 33 which extends up through an opening 34 in the member 6. This opening is sufficiently large to permit the post to move up and down and also transversely.

It will be noted that the vibrating device is pivoted and therefore the upper end of the post will not only move up and down but will also move sidewise or back and forth in a transverse direction. The needle of the certain sound producer moves vertically in some machines while in others it moves transversely. The post having the combined movements above noted will therefore vibrate the sound producing diaphragm of either instrument.

The correct number of teeth or serrations is obtained in the following manner: First I determine the tone of standard pitch to be employed as the master tone. For the sake of illustration, I will designate the tone as the key of A, which has 435 vibrations per second. Let us suppose that the phonograph table is designed to make 78 revolutions per minute or 1.3 revolutions per second. I divide the number of vibrations per second in the standard note, that is 435, by 1.3 which gives 334.59. I provide the disk or driven member 5, therefore, with 335 teeth or serrations. If the table is to be driven at 80 revolutions per minute then the number of teeth is determined by the same formula and there will be a slightly less number of teeth. The serrations 15 are intended to represent the desired speed of 80 revolutions per minute. It will be noted that the vibrating member 17 coöperates with the serrations 15 and the vibrating member 16 coöperates with the serrations 14. When, therefore, it is desired to obtain 80 revolutions in the phonograph table, as indicated in Fig. 1, and the needle of the reproducer of the machine is placed on the post 33, as the table rotates the serrations 15 cause the member 17 to vibrate and this through the reproducer will cause a certain tone to be produced and sustained. The speed of the table is then adjusted until this tone corresponds exactly to the tone of a standard pitch pipe or tuning fork of the key of A. Of course, other standard keys may be used in which case the serrations will be accordingly changed.

From the above it will be noted that the tone or sound produced by the speed regulating device is a mathematically determined tone and will be an accurate tone and not liable to variations such as are present in the key record produced on a master phonograph the speed of which may be variable and by the use of a sustained tone produced for example by a flute, which also may be inaccurate.

As above noted, my device is equally adapted for obtaining a predetermined speed in any driven member, the essential feature consisting in the driving of the driven member by and in synchronism with the movable element in which it is desired to obtain a predetermined speed, mathematically dividing this driven member so as to form serrations which will produce a standard tone when a driven member revolves at its desired predeterinmed speed and then comparing the tone produced by said driven member with a standard pitch pipe or tuning fork producing the standard tone.

It is obvious that minor changes in the details of construction may be made without departing from the spirit of the invention as set forth in the appended claims.

Having thus described my invention, what I claim as new and desire to secure by Letters Patent, is:—

1. A device for obtaining a predetermined speed in a driven member including in combination, a revoluble member moved by and in synchronism with the driven member, said revoluble member having a mathematically divided surface producing vibrations and means coöperating with said mathematically divided surface for producing a sound.

2. A device for obtaining a predetermined speed in a driven member including in combination, a revoluble member moved by and in synchronism with the driven member, said revoluble member having a mathematically determined number or serrations for producing vibrations, a fixed member, a vibrating device carried by said fixed member and adapted to be engaged with said serrations and means whereby said vibrating device may be caused to produce a sound.

3. A device for obtaining a predetermined speed in a driven member including in combination, a revoluble disk having on its upper face a mathematically determined number of serrations adapted to produce vibrations, a stationary member rotatably connected with said revoluble member, a supporting bracket, a vibrating device hinged to said supporting bracket and having a projection adapted to be engaged with said serrations and means whereby the vibrations of said device may be utilized for producing a sound.

4. A device for obtaining a predetermined speed in a driven member including in combination, a revoluble disk having on its upper face a mathematically determined number of serrations adapted to produce vibrations, a stationary member rotatably connected with said revoluble member, a supporting bracket, a vibrating device hinged to said supporting bracket and having a projection adapted to be engaged with said serrations, said stationary member having an opening therethrough, a post rigidly connected with said vibrating device and extending through said opening.

5. A device for obtaining a predetermined speed in a driven member including in combination, a revoluble disk having on its upper face a mathematically determined number of serrations adapted to produce vibrations, a stationary member rotatably connected with said revoluble member, a supporting bracket, a vibrating device hinged to said supporting bracket and having a projection adapted to be engaged with said serrations, said stationary member having an opening therethrough, a post rigidly connected with said vibrating device and extending through said opening and a spring for normally holding said vibrating device out of engagement with said serrations.

6. A device for obtaining a predetermined speed, including a disk adapted to revolve and having on its surface serrations concentric with the axis of said disk, a member revolubly connected with said disk and having a knurled head whereby said member may be held from rotation, a vibrating member carried by said last named member and adapted to engage said serrations, a spring for normally holding said devices out of engagement with said serrations.

7. A device for obtaining a predetermined speed, including a disk adapted to revolve and having on its surface serrations concentric with the axis of said disk, a member revolubly connected with said disk and having a knurled head whereby said member may be held from rotation, a vibrating device carried by said last named member and adapted to engage said serrations, a spring for normally holding said devices out of engagement with said serrations, said vibrating device having a post extending through an opening in the member.

8. A device for obtaining a predetermined speed, including in combination, a disk having a felt pad on its under surface and an opening centrally therethrough, a sleeve secured to said disk and extending upwardly therethrough, a member revolubly mounted on said sleeve and spaced from said disk, said revoluble member having a knurled head whereby the same may be held from rotation, means for securing the disk to said member, said disk having serrations formed concentric to the opening therein and adapted to produce vibrations, a bracket secured to the under face of the member, a vibrating device pivotally supported by the bracket and having a projection adapted to engage the serrations, a spring for normally holding said device out of engagement with said serrations, a post secured to said vibrating device and extending through an opening in said member.

9. A device for obtaining predetermined speeds in a driven device including a revoluble member and a stationary member, said revoluble member having two rows of serrations formed therein corresponding respectively to the predetermined speeds desired and which are concentric with the axis of rotation of said member, a vibrating device associated with each row of serrations, means whereby said vibrating devices may be caused to produce a sound.

10. A device for obtaining predetermined speeds in a driven device including a revoluble member and a stationary member, said revoluble member having two rows of serrations formed therein corresponding respectively to the predetermined speeds desired and which are concentric with the axis of rotation of said member, a vibrating device associated with each row of serrations, means whereby said vibrating devices may be caused to produce a sound, each vibrating device having yielding means for normally holding the same out of engagement with the serrations.

11. A device for obtaining a predetermined speed in a driven member including a revoluble member formed of bakelite and having a felt pad secured to the under face thereof, said revoluble member having a row of serrations on its upper face concentric with the axis of rotation of said member, a stationary member, one of said members having a sleeve molded therein and projecting therethrough, the other member having a recess adapted to engage said sleeve, means for holding said members together, said stationary member having a vibrating device adapted to engage said serrations, and a spring for normally holding said vibrating device out of engagement with said serrations.

In testimony whereof I hereunto affix my signature.

WILLIAM WARREN DEAN.